(12) United States Patent
Bhat et al.

(10) Patent No.: US 11,095,520 B1
(45) Date of Patent: Aug. 17, 2021

(54) REMOTE RESOURCE CAPACITY AND UTILIZATION MANAGEMENT

(71) Applicant: INTERNATIONAL BUSINESS MACHINES CORPORATION, Armonk, NY (US)

(72) Inventors: Badekila Ganesh Prashanth Bhat, Bangalore (IN); Shinoj Zacharias, Bangalore (IN); Sachin Maneshwar Nayak, Bangalore (IN); Manjunath Veerabhadraiah, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/931,826

(22) Filed: May 14, 2020

(51) Int. Cl.
*G06F 15/173* (2006.01)
*H04L 12/24* (2006.01)
(Continued)

(52) U.S. Cl.
CPC .......... *H04L 41/0896* (2013.01); *G06N 5/04* (2013.01); *G06N 20/00* (2019.01); *H04L 41/147* (2013.01);
(Continued)

(58) Field of Classification Search
CPC ............. H04L 41/0896; H04L 41/5051; H04L 41/147; H04L 41/5003; H04L 41/18;
(Continued)

(56) References Cited

U.S. PATENT DOCUMENTS 8,145,456 B2  3/2012  Cherkasova
8,868,692 B1 * 10/2014  Khanna .................. H04L 67/34
                                                                709/219
(Continued)

OTHER PUBLICATIONS

Aljabari, Ghannam; Server Load Prediction Based on Dynamic Neural Networks; ; Palestine Polyetchnic University; retrieved from the Internet http://staff.ppu.edu/galjabari/files/22.

(Continued)

*Primary Examiner* — Abdullahi E Salad
(74) *Attorney, Agent, or Firm* — Schmeiser, Olsen & Watts; Christopher M. Pignato

(57) ABSTRACT

A method, system, and program product for implementing a remote resource capacity and utilization optimization is provided. The method includes determining associations with a specified geographical region and an associated topic of interest with respect to social media Website traffic and trends associated with utilization of remote hardware and software resources. Current and historical software application downloads are tracked with respect to the social media Website traffic and trends and a currently consumed capacity of the remote hardware and software resources are detected with respect to the specified geographical region. Future resource requirements associated with the currently consumed capacity are determined and data representing the current and historical software application downloads is stored. An overall system capacity for enabling regionally specific demand surges associated with regional Web traffic is determined and a specified group of hardware and software resources for increasing the overall system capacity is enabled.

17 Claims, 11 Drawing Sheets

(51) Int. Cl.
*G06N 20/00* (2019.01)
*G06N 5/04* (2006.01)
*G06F 8/60* (2018.01)
*G06F 16/22* (2019.01)

(52) U.S. Cl.
CPC ...... H04L 41/5051 (2013.01); H04L 41/5083 (2013.01); *G06F 8/60* (2013.01); *G06F 16/22* (2019.01); *H04L 41/16* (2013.01); *H04L 41/18* (2013.01); *H04L 41/22* (2013.01); *H04L 41/5003* (2013.01)

(58) Field of Classification Search
CPC ... H04L 41/22; H04L 29/08072; H04L 29/06; H04L 29/0809; H04L 63/08; H04L 63/102; G06N 20/00; G06N 5/04; G06F 8/60; G06F 16/22
See application file for complete search history.

(56) References Cited

U.S. PATENT DOCUMENTS

| | | | |
|---|---|---|---|
| 9,280,394 B2 | 3/2016 | Abuelsaad | |
| 10,430,218 B2 | 10/2019 | Li | |
| 2009/0222811 A1* | 9/2009 | Faus | G06F 8/65 717/173 |
| 2011/0016465 A1* | 1/2011 | Siegel | H04L 67/34 717/178 |
| 2011/0060717 A1* | 3/2011 | Forman | G06F 16/9535 706/54 |
| 2012/0278186 A1* | 11/2012 | Hayton | G06Q 30/0214 705/14.73 |
| 2015/0288571 A1 | 10/2015 | Baughman | |
| 2017/0140312 A1* | 5/2017 | Pai | G06Q 10/0875 |
| 2019/0073733 A1* | 3/2019 | Steinhardt | G06Q 30/0641 |
| 2019/0188743 A1* | 6/2019 | Phillips | G06Q 30/0205 |
| 2020/0061472 A1* | 2/2020 | Jacoby | G07F 17/3227 |

OTHER PUBLICATIONS

AWS; Introducing Predictive Scaling for Amazon EC2 in AWS Auto Scaling; https://aws.amazon.com/about-aws/whats-new/2018/11/introducing-predictive-scaling-for-amazon-EC2-in-aws-auto-scaling/; Nov. 20, 2018; 3 pages.

Boone, Rick; "Capacity Prediction" instead of "Capacity Planning": How Uber uses machine learning to accurately forecast resource utilization; retrieved from the Internet Feb. 27, 2020; https://www.usenix.org/sites/default/files/conference/protected-files/srecon18americas_slides_boone.pdf; 19 pages.

Khan, Arijit et al.; Workload characterization and prediction in the cloud: A multiple time series approach; Proceedings of the 2012 IEEE Network Operations and Management Symposium; Apr. 2012; pp. 1287-1294.

Singh, Parminder et al.; Research on Auto-Scaling of Web Applications in Cloud: Survey, Trends and Future Directions; Scalable Computing: Practice nd Experience; vol. 20, No. 2; May 2019; pp. 399-431.

Yanggratoke, Remgvit; Data-driven Performance Prediction and Resource Allocation for Cloud Services; PhD Theses; Feb. 2016; 54 pages.

* cited by examiner

REMOTE RESOURCE CAPACITY AND UTILIZATION MANAGEMENT

BACKGROUND

The present invention relates generally to a method for remotely managing resource capacity and utilization and in particular to a method and associated system for improving software and server technology associated with tracking software application downloads, detecting a capacity of remote hardware and software resources, determining future resource requirements, and determining a system capacity for resolving Web traffic demand surges.

SUMMARY

A first aspect of the invention provides a remote resource capacity and utilization optimization method comprising: determining, by a processor of a remote server executing remote media discovery code, associations with a specified geographical region and an associated topic of interest with respect to social media Website traffic and trends associated with utilization of remote hardware and software resources; tracking, by the processor via a download sensor, current and historical software application downloads with respect to the social media Website traffic and trends; detecting, by the processor via a plurality of sensors, a currently consumed capacity of the remote hardware and software resources with respect to the specified geographical region; determining, by the processor, future resource requirements associated with the currently consumed capacity of the remote hardware and software resources; storing, by the processor within a database, data representing the current and historical software application downloads and the future resource requirements; determining, by the processor based on analysis of the data, an overall system capacity for enabling regionally specific demand surges associated with regional Web traffic; and enabling, by the processor, a specified group of hardware and software resources for increasing the overall system capacity.

A second aspect of the invention provides a computer program product, comprising a computer readable hardware storage device storing a computer readable program code, the computer readable program code comprising an algorithm that when executed by a processor of a remote server device implements a remote resource capacity and utilization optimization method, the method comprising: determining, by the processor executing remote media discovery code, associations with a specified geographical region and an associated topic of interest with respect to social media Website traffic and trends associated with utilization of remote hardware and software resources; tracking, by the processor via a download sensor, current and historical software application downloads with respect to the social media Website traffic and trends; detecting, by the processor via a plurality of sensors, a currently consumed capacity of the remote hardware and software resources with respect to the specified geographical region; determining, by the processor, future resource requirements associated with the currently consumed capacity of the remote hardware and software resources; storing, by the processor within a database, data representing the current and historical software application downloads and the future resource requirements; determining, by the processor based on analysis of the data, an overall system capacity for enabling regionally specific demand surges associated with regional Web traffic; and enabling, by the processor, a specified group of hardware and software resources for increasing the overall system capacity.

A third aspect of the invention provides a remote server comprising a processor coupled to a computer-readable memory unit, the memory unit comprising instructions that when executed by the processor implements a remote resource capacity and utilization optimization method comprising: determining, by the processor executing remote media discovery code, associations with a specified geographical region and an associated topic of interest with respect to social media Website traffic and trends associated with utilization of remote hardware and software resources; tracking, by the processor via a download sensor, current and historical software application downloads with respect to the social media Website traffic and trends; detecting, by the processor via a plurality of sensors, a currently consumed capacity of the remote hardware and software resources with respect to the specified geographical region; determining, by the processor, future resource requirements associated with the currently consumed capacity of the remote hardware and software resources; storing, by the processor within a database, data representing the current and historical software application downloads and the future resource requirements; determining, by the processor based on analysis of the data, an overall system capacity for enabling regionally specific demand surges associated with regional Web traffic; and enabling, by the processor, a specified group of hardware and software resources for increasing the overall system capacity.

The present invention advantageously provides a simple method and associated system capable of accurately managing resource capacity and utilization.

DETAILED DESCRIPTION

Figure 1:
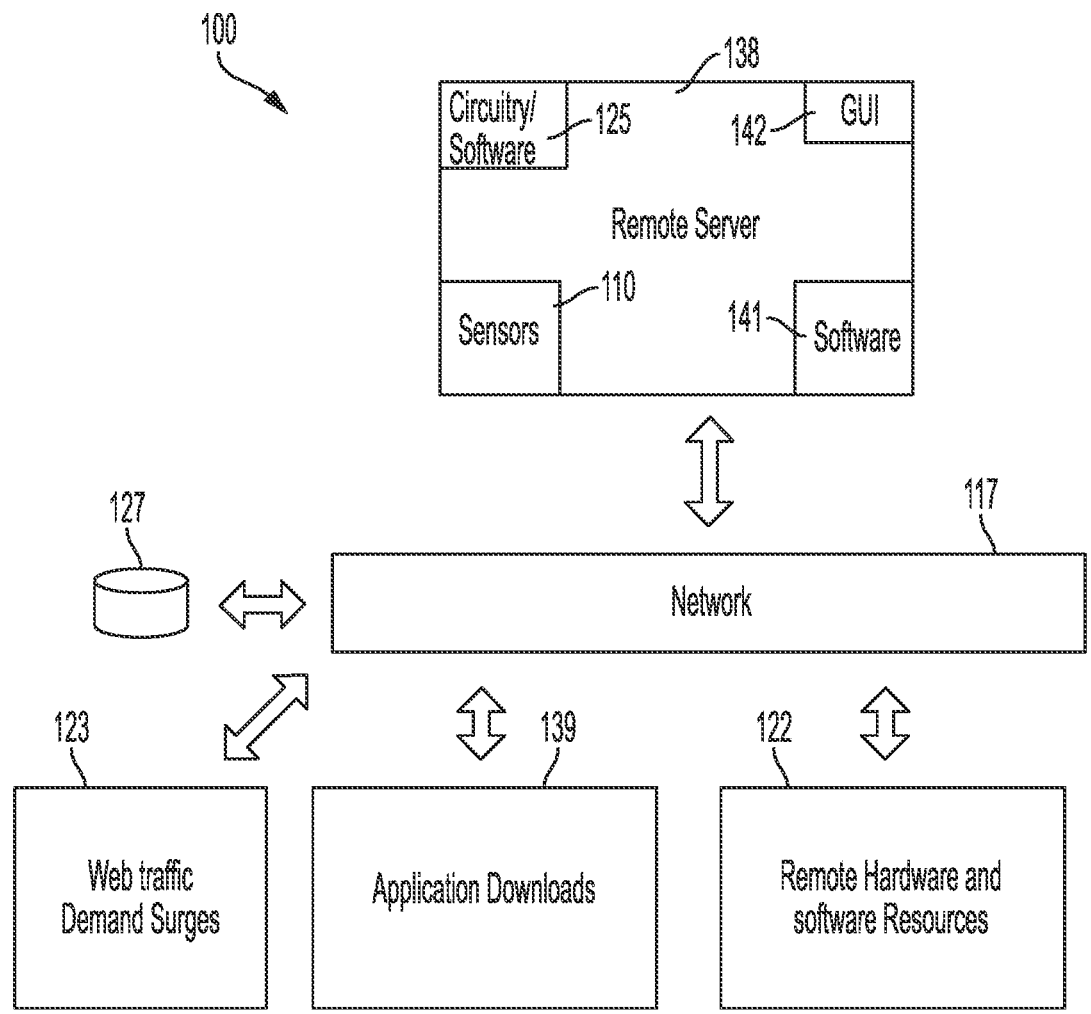
FIG. 1 illustrates a system improving software and server technology associated with tracking software application downloads, detecting a capacity of remote hardware and software resources, determining future resource requirements, and determining a system capacity for resolving Web traffic demand surges, in accordance with embodiments of the present invention.

FIG. 1 illustrates a system 100 for improving software and server technology associated with tracking software application downloads 139, detecting a capacity of remote hardware and software resources 122, determining future resource requirements, and determining a system capacity for resolving Web traffic demand surges 123, in accordance with embodiments of the present invention. Typical cloud computing systems are used for managing differing resources without maintenance. An entity may enable a specified resource based on an associated requirement such that an associated resource remission is only required based on typical usage. Likewise, entities running heavy loads with respect to a cloud infrastructure may attempt to scale resources when required such that associated services may run seamlessly without any downtime. Additionally, server applications associated with resources may be required to be located within a geography that is close to incoming requests. Therefore, system 100 enables a process for predicting external geo-specific load factors and pro-actively scaling hardware and software resources before an actual load function is enabled. For example, an e-commerce company may implement seasonal promotional sales (e.g., for holidays, seasons, etc.) resulting in a higher usage/conversion with respect to hardware and software resource usage. The higher usage/conversion rate results in an unknown resource requirement. Therefore, system 100 enables a process for determining future resource requirements associated with selecting and managing hardware and software resources needed for enabling hardware and software operation during a specified seasonal promotional sale.

System 100 of FIG. 1 includes a remote server 138 (i.e., specialized hardware device), software application downloads 139, a database 127, and remote hardware and software resources 122 interconnected through a network 117. Remote server 138 may include, inter alia, a computing device, a dedicated device, server hardware, etc. Remote server 138 may be Bluetooth enabled to provide connectivity to any type of system. Remote server 138 includes specialized circuitry/software 125 (that may include specialized software), sensors 110, software 141, and a GUI 142. Sensors 110 may include any type of internal or external sensor (or biometric sensor) including, inter alia, ultrasonic three-dimensional sensor modules, an optical sensor, a video retrieval device, an audio retrieval device, humidity sensors, voltage sensors, a keyboard, a mouse, a touch screen, a temperature sensor, etc. Application downloads 139 include any type of software downloads necessary for enabling system 100 to modify system capacity for resolving Web traffic demand surges 23. Remote hardware and software resources 122 comprise any type of hardware and/or software resources (e.g., servers, controllers, memory structures, processors, etc.) associated with modifying system capacity for resolving Web traffic demand surges 23 with respect to specified Web events. Remote server 138 may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, remote server 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for tracking software application downloads, detecting a capacity of remote hardware and software resources, determining future resource requirements, and determining a system capacity for resolving Web traffic demand surges 23. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables a process for predicting geo-specific/region specific capacity requirements affecting resource utilization associated with cloud based social media analytics and application download trends. Likewise, the process includes determining a region-specific surge in resource demand. System 100 enables the following functionality with respect to determining a system capacity for resolving Web traffic demand surges 23:

1. Utilizing a cloud based social media discovery service (SMD) to calculate an interest score for a specified topic per geographical region based on a number of trends for a topic with respect to social media Website traffic.

2. Utilizing an application download tracker (ADT) to calculate an ADT score based on (software) application download trends, a previous application download score retrieved from a historical database, and number of applications downloaded from an application data store.

3. Utilizing historical capacity prediction data (HCD) by storing historical data associated with each download event in combination with an actual consumed capacity within each geographical region. Additionally, a historical interest score and corresponding resource requirement predictions are stored.

4. Utilizing a cognitive scale prediction engine (CSP) for determining a capacity factor based on the SMD score, the ADT score. an actual consumed capacity for previous events within each geographical region, and corresponding hardware and software resource requirement predictions.

Figure 2:
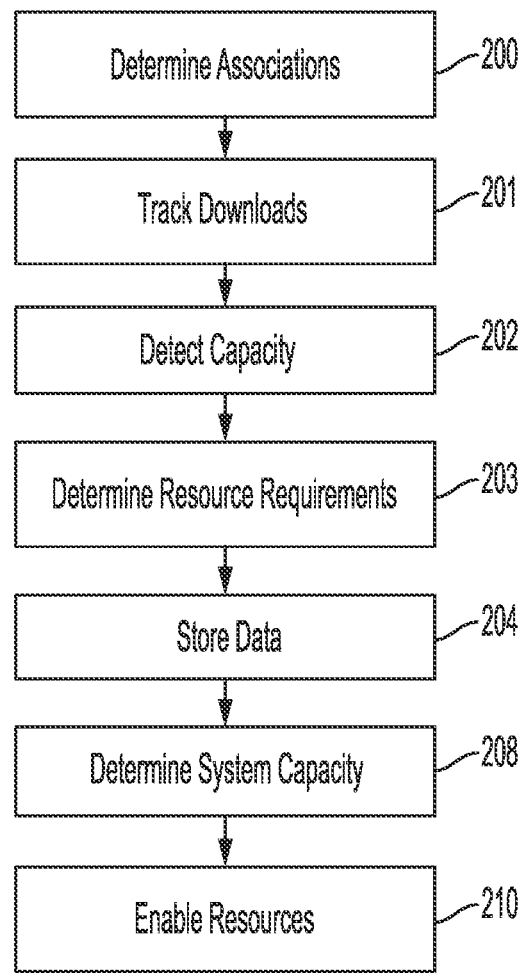
FIG. 2 illustrates an algorithm detailing a process flow enabled by the system of FIG. 1 for improving software and server technology associated with tracking software application downloads, detecting a capacity of remote hardware and software resources, determining future resource requirements, and determining a system capacity for resolving Web traffic demand surges, in accordance with embodiments of the present invention.

FIG. 2 illustrates an algorithm detailing a process flow enabled by system 100 of FIG. 1 for improving software and server technology associated with tracking software application downloads, detecting a capacity of remote hardware and software resources, determining future resource requirements, and determining a system capacity for resolving Web traffic demand surges, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by remote server 138 and remote hardware and software resources 122. In step 200, associations with a specified geographical region are determined. Additionally, the associations are determined with respect to an associated topic of interest with respect to social media Website traffic and trends associated with utilization of remote hardware and software resources. Determining the associations may include:

1. Retrieving website data from a plurality of social media Websites associated with the social media Website traffic and trends.
2. Aggregating the Website data.
3. Generating (based on aggregated data generated in response to aggregating the Website data) a regional score for the utilization of the remote hardware and software resources with respect to the specified geographical region.

In step 201, current and historical software application downloads are tracked (via a download sensor) with respect to the social media Website traffic and trends. Tracking the current and historical software application downloads may include:

1. Detecting a total number of downloads of the current and historical software application downloads.
2. Determining (based on analysis of the total number of downloads) active user trends with respect to users associated with the current and historical software application downloads.
3. Determining (based on analysis of the active user trends) an additional trend associated with a number of users across the specified geographical region detected as being associated with a previous download event executed via the remote hardware and software resources.
4. Generating an application download tracker (ADT) score associated with a previously determined ADT score with respect to currently active users, the total number of downloads, and a total number of new downloads of the current and historical software application downloads.

In step 202, a currently consumed capacity of the remote hardware and software resources are detected (via a plurality of sensors) with respect to the specified geographical region. In step 203, future resource requirements associated with the currently consumed capacity of the remote hardware and software resources are determined. In step 204, data representing the current and historical software application downloads and the future resource requirements are stored within a database. Storing the data may include:

1. Storing the data with respect to all download events executed via the remote hardware and software resources.
2. Storing consumption data associated with the currently consumed capacity of the remote hardware and software resources with respect to the specified geographical region.
3. Storing a historical interest score associated with predictions for future resource requirements.

In step 208, an overall system capacity for enabling regionally specific demand surges associated the regional Web traffic is determined based on analysis of the data of step 204. Additionally, a correction factor associated with capacity requirements for overall system capacity with respect to the specified geographical region is determined. Determining the overall system capacity may include determining a capacity factor as a function of the regional score with respect to the ADT score and the correction factor. The overall system capacity may include cloud storage capacity.

In step 210, a specified group of hardware and software resources are enabled for increasing the overall system capacity.

Figure 3:
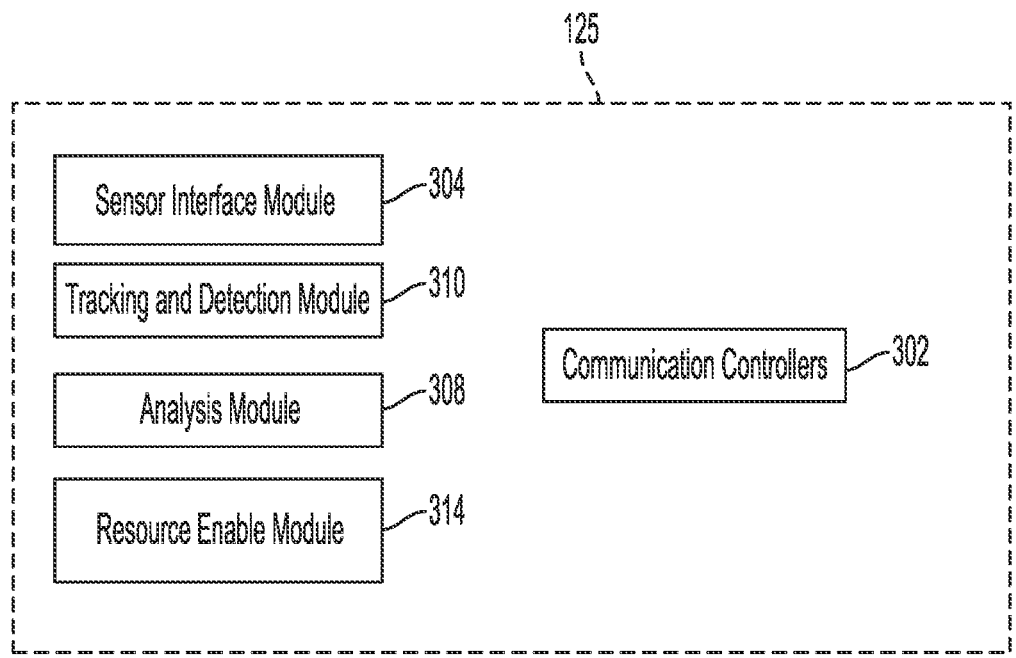
FIG. 3 illustrates an internal structural view of the circuitry/software of FIG. 1, in accordance with embodiments of the present invention.

FIG. 3 illustrates an internal structural view of circuitry/software 125 of FIG. 1, in accordance with embodiments of the present invention. Circuitry/software 125 includes a sensor interface module 304, a tracking and detection module 310, an analysis module 308, a resource enabling module 314, and communication controllers 302. Sensor interface module 304 comprises specialized hardware and software for controlling all functions related to sensors 110 of FIG. 1. Tracking and detection module 310 comprises specialized hardware and software for controlling all functionality related to tracking and detection processes for implementing the process described with respect to the algorithm of FIG. 2. Analysis module 308 comprises specialized hardware and software for controlling all functions related to the analysis steps of FIG. 2. Resource enabling module 314 comprises specialized hardware and software for controlling all functions related to enabling hardware and software resources in accordance with the algorithm of FIG. 2. Communication controllers 302 are enabled for controlling all communications between sensor interface module 304, tracking and detection module 310, analysis module 308, and resource enabling module 314.

Figure 4:
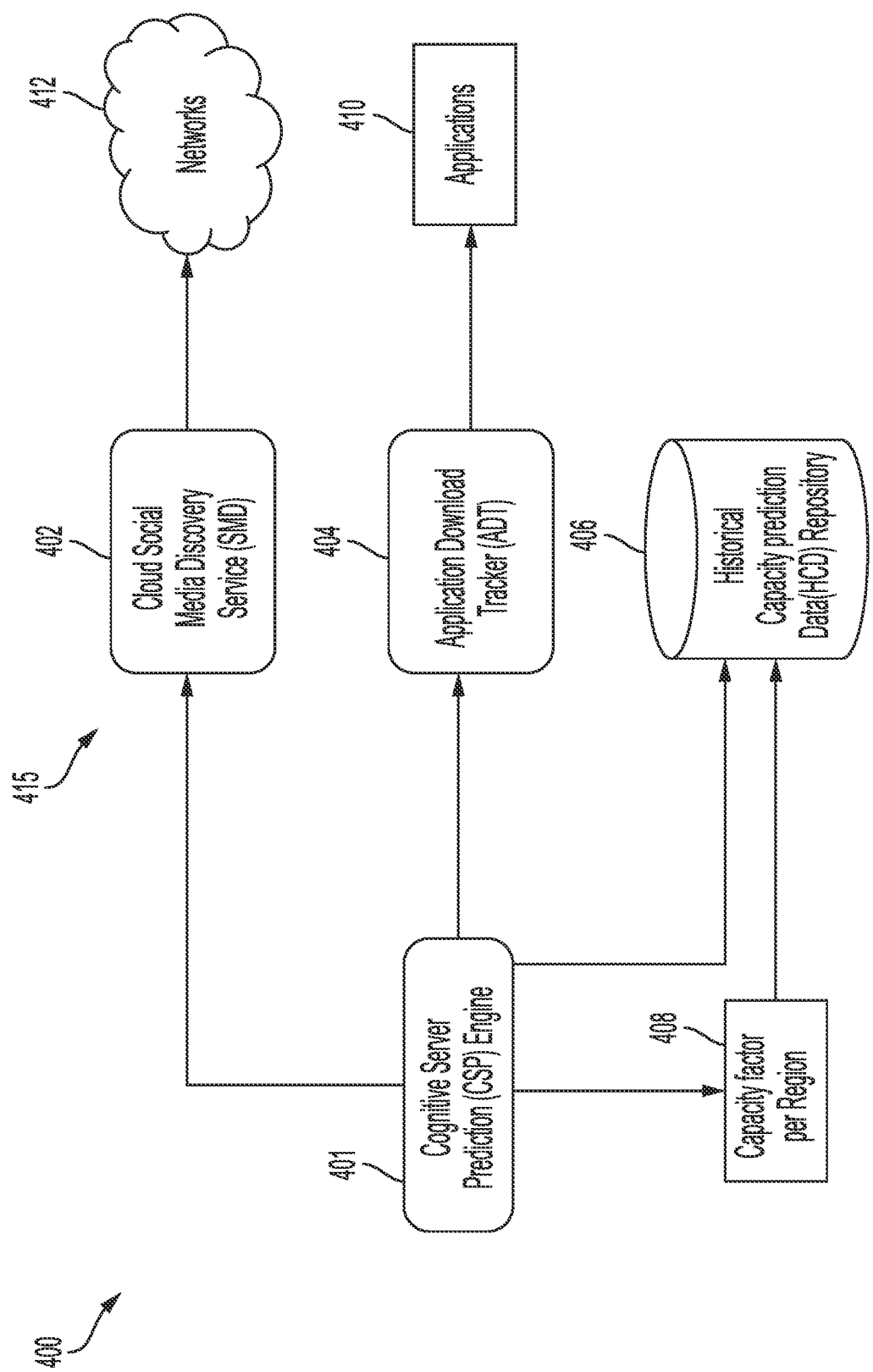
FIG. 4 illustrates a system for enabling a process for predicting geo-specific capacity requirements affecting hardware and software resource utilization with respect to cloud computing, in accordance with embodiments of the present invention.

FIG. 4 illustrates a system 400 for enabling a process for predicting geo-specific capacity requirements affecting hardware and software resource utilization with respect to cloud computing, in accordance with embodiments of the present invention. The geo-specific capacity requirements are predicted based on social media analytics and application download trends to determine a region-specific surge in resource demand. System 400 includes a cognitive server prediction (CSP) engine 410 (i.e., specialized hardware and software), a cloud-based media discovery service (SMD) 402, an application download tracker (ADT) 404, and a historical capacity prediction (HCD) repository 406 connected through a network 415.

SMD 402 is configured to generate an interest score (IS) for a specified Web topic associated with networks 412. For example, an IS may be generated for a specified application associated with an event such as a musical performance, a specified sales event, a sporting event, etc. Additionally, a highest trend associated with the event is identified.

ADT 404 is configured to track application download trends for applications 410. Application store analytics code may be executed for inferring application download trends.

HCD repository 406 is configured to store historical capacity data for each event.

CSP engine 401 is configured to analyzes input from SMD 402, ADT 404, and HCD repository 406. The analysis results in determining a region, time-period, and cloud capacity requirements 408.

Figure 5A:
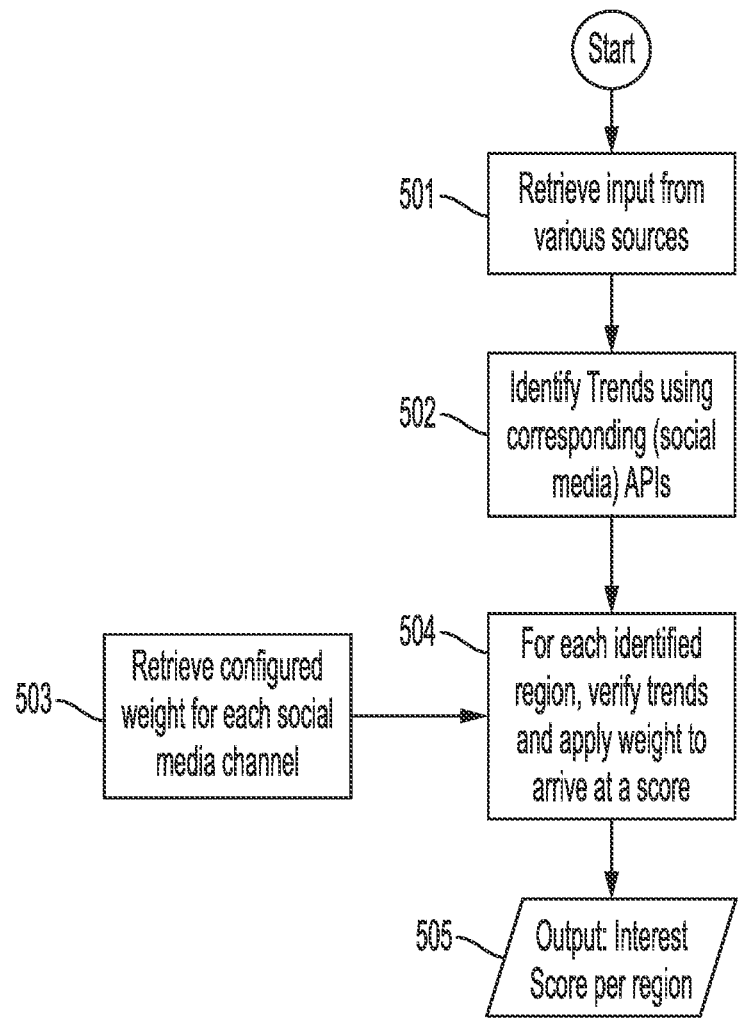
FIG. 5A illustrates an algorithm detailing a process flow enabled by the SMD of FIG. 4, in accordance with embodiments of the present invention.

FIG. 5A illustrates an algorithm detailing a process flow enabled by SMD 402 of FIG. 4, in accordance with embodiments of the present invention. In step 501, input data is retrieved from social media channels. In step 502, trends associated with application programming interfaces (APIs) of the social media channels are identified. In step 504, trends are verified for each identified region based on a configured weight retrieved for each media channel in step 503. In step 505, all information of the previous steps is aggregated to generate an SMD score per region. For example, with respect to a sporting event being streamed on an application, SMD 402 retrieves a number of likes from social media sources per each geographical region. Each social media source is associated with a different weight. Based on a weight and a number of hits from each social media source, an interest (SMD) score is generated per each geographical region.

Figure 5B:
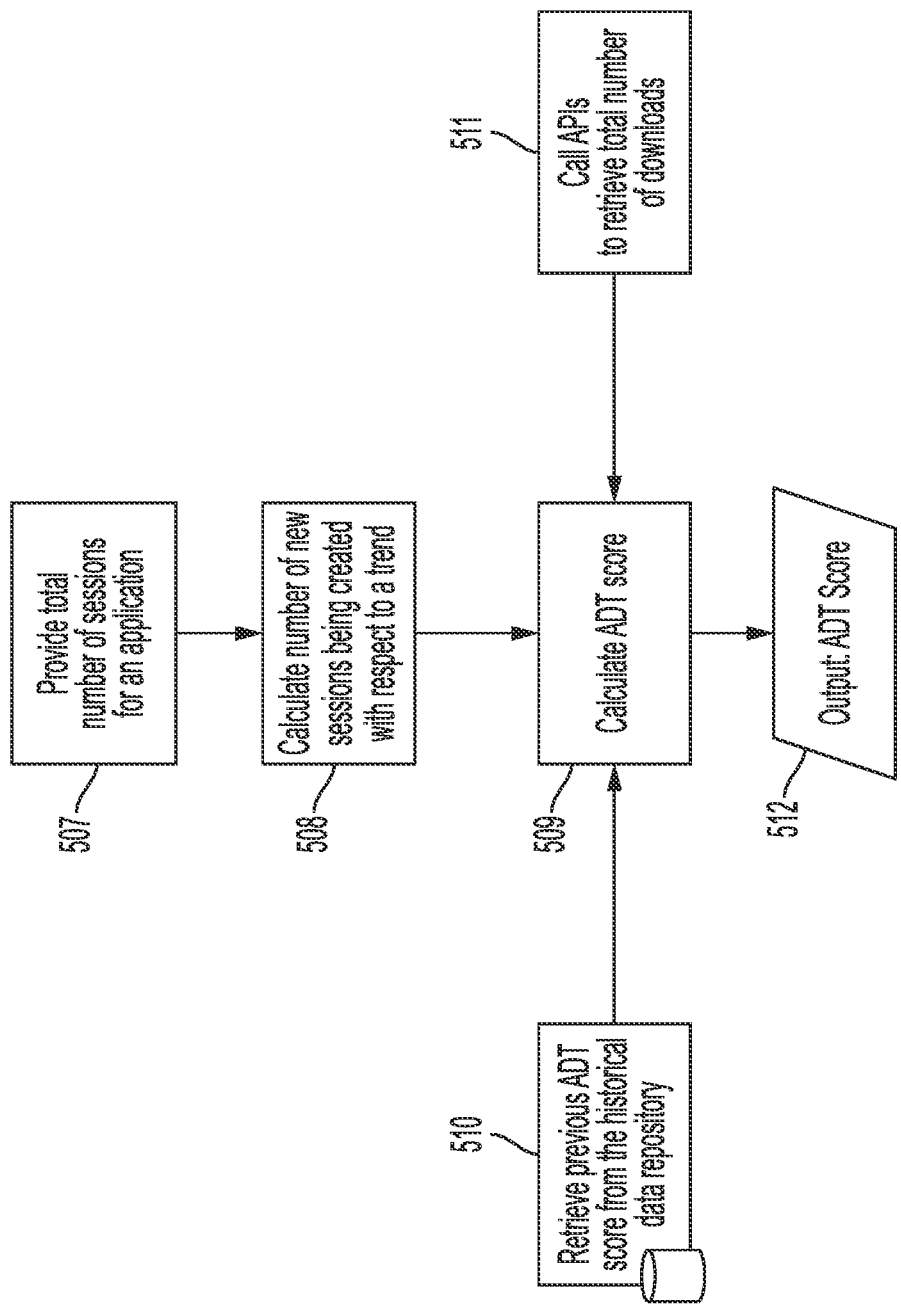
FIG. 5B illustrates an algorithm detailing a process flow enabled by the ADT of FIG. 4, in accordance with embodiments of the present invention.

FIG. 5B illustrates an algorithm detailing a process flow enabled by ADT 404 of FIG. 4, in accordance with embodiments of the present invention. In step 507, a total number of application downloads retrieved from the application store is provided. In step 508, a number of new download sessions is calculated with respect to an active user trend. For example, since a last download event, a number of active users may have increased by 30%. Additionally, a trend for a number of users across regions participating in a previous event may be derived. In step 509, an ADT score is calculated with respect to historical data retrieved in step 510 and a number of downloads retrieved in step 511. The ADT score may be calculated as follows:

ADT Score=(Previous ADT Score)+({active users}/{total downloads})*{total new downloads}. In step 512, the ADT score is outputted to a GUI.

Figure 5C:
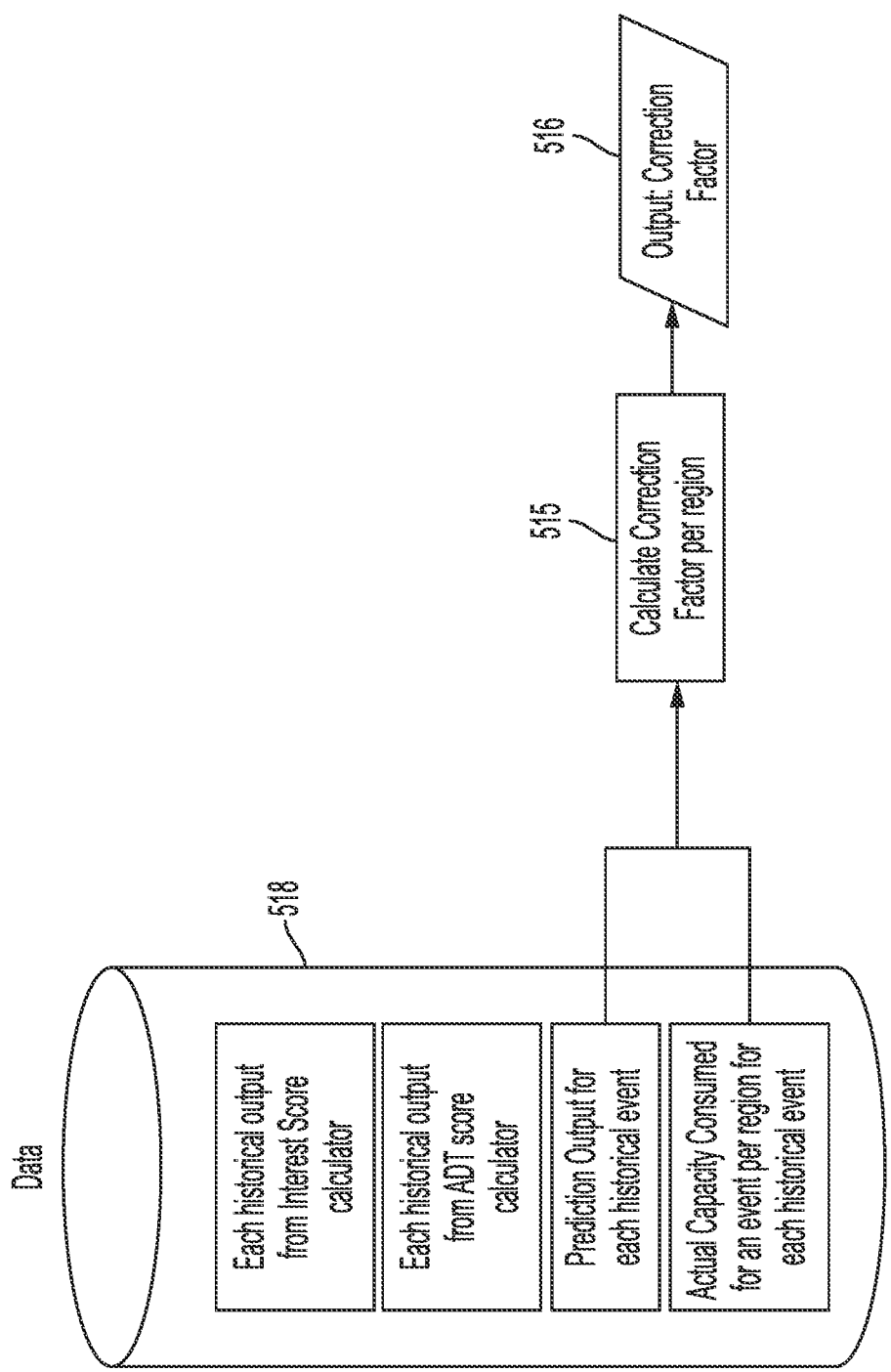
FIG. 5C illustrates an algorithm detailing a process flow enabled by the HCD of FIG. 4, in accordance with embodiments of the present invention.

FIG. 5C illustrates an algorithm detailing a process flow enabled by HCD 406 of FIG. 4, in accordance with embodiments of the present invention. In step 515, a correction factor is calculated for each geographical region as follows: Correction Factor=Actual Capacity/Capacity requirement predicted. The correction factor is calculated based on data retrieved from a database 518. Database 518 includes historical interest score data, historical output from an ADT score calculator, a prediction output for each historical event, and an actual capacity for each regional event. In step 516, the correction factor is outputted to a GUI.

Figure 5D:
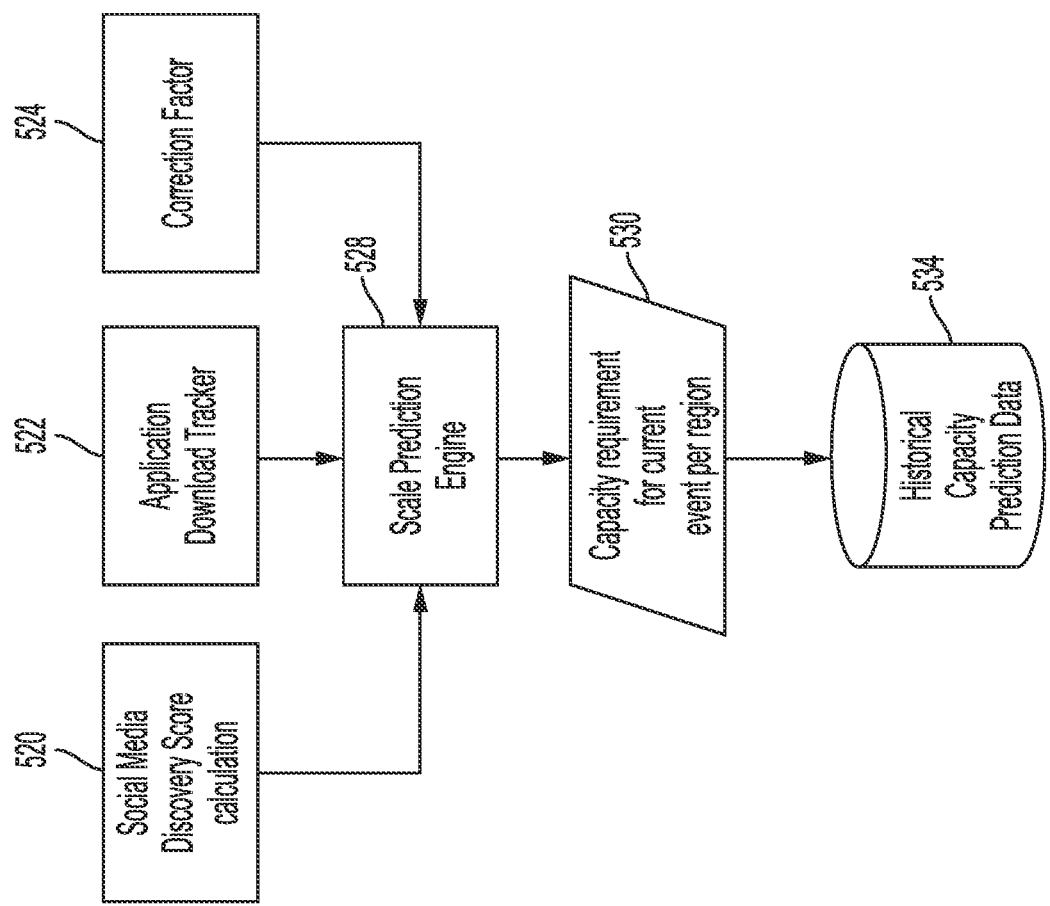
FIG. 5D illustrates an algorithm detailing a process flow enabled by the CSP engine of FIG. 4, in accordance with embodiments of the present invention

FIG. 5D illustrates an algorithm detailing a process flow enabled by CSP engine 401 of FIG. 4, in accordance with embodiments of the present invention. CSP engine 401 is configured to learn (over time) to generate a region-specific cloud capacity requirement. CSP engine 401 transmits (social media score) input 520 (from SMD 402 of FIG. 4), input 522 (from ADT 404 of FIG. 4), and (correction) input 524 from a capacity determination component to a scale prediction engine 528. Inputs 520, 522, and 524 are used to generate an actual capacity required within each geographical region to serve a network load. Input 522 is used by ADT 404 for presenting a pool of all active users as a score or percentage. Input 520 is used by SMD 402 to filter a number of interested people. Input 524 is used to generate an actual capacity of previous events with respect to additional predictions (i.e., an error rate). The error rate may be applied to a capacity determination result to generate a corrected capacity factor per geographical region. A capacity factor is generated as follows: Capacity Factor=SMD Score*ADT Score*Correction Factor. The capacity factor may be used in step 530 to generate a capacity required within each geographical region to serve a load. Data representing the capacity required is stored within an historical capacity data (HDS) system 534.

The following implementation example associated with resource capacity optimization illustrates a process associated with a mobile application being enabled to live stream an event. The mobile application may be configured for discussion, notifications, and live streaming. The process is initiated by retrieving previous download events data for the event. For example, data for a region A with respect to a previous event comprises the following values:
1. SMD=3.66
2. ADT=5000
3. Correction Factor=1

Therefore, a capacity factor=18300. The capacity factor is analyzed to determine a current number of nodes (i.e., 19) of a server required for region A. Additionally, it is determined that an actual number of nodes required for a previous event was 10.

The SMD value is calculated by retrieving trends/likes for the live streaming event from different social media channels and based on the number of likes/interests per geographical region, an interest score is calculated. For example, a first social networking website may receive 1000 hits and a weight given by company to the first social networking Website comprises 8 out of 10. Likewise, a second social networking Website may receive 2000 hits with an applied weight of 4 and a third social networking Website may receive 3000 hits with an applied weight of 2. Therefore, an SMD score for a current event=3.66.

The ADT value is calculated by tracking application downloads for the mobile application obtained from APIs associated with a play store. Analytics data from the first social networking Website illustrates an increase in active users for this application and based on the above two data sets and the previous download score, an ADT score is generated as follows:

It is determined that a total number of all downloads for the mobile application is 10000 and a total number of active users=5000. Additionally, a total number of new downloads over an interval of 3 months=2000. Likewise, a previous ADT value=5000+2000*(5000/1000)=6000 and therefore a new ADT value=6000.

A correction factor comprises a prediction of capacity used for a previous download event and is stored in an HRD database. Data identifying an actual server used is additionally stored within the HRD database. Therefore, a correction factor for the prediction is generated as follows:

A previous predicted capacity factor=19 and an actual capacity used=10 and therefore a correction factor=10/19=0.52.

A predicted capacity factor is applied as a learning tool into the system so that the system improves over time. A capacity factor for the current event is predicted for each region based on the following values: an SMD score, an ADT score, and a correction factor The above output may be used as indicative input to allocate capacity for each region for an upcoming event. The output is additionally fed into the HRD for further learning and correction for future events.

A current capacity factor=3.66 (SMD)×6000 (ADT)×0.52 (Correction Factor)=11419. A resulting predicted capacity comprises 12 Nodes.

Figure 6:
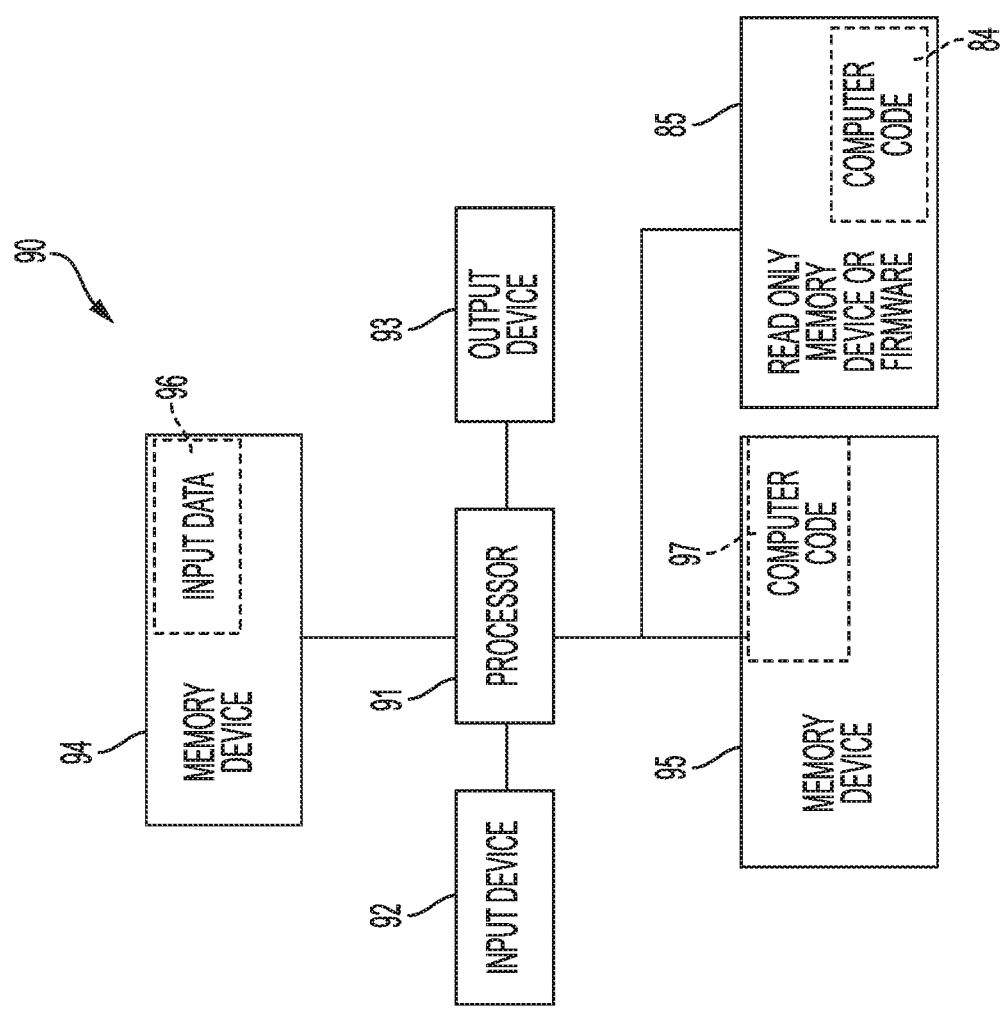
FIG. 6 illustrates a computer system used by the system of FIG. 1 improving software and server technology associated with tracking software application downloads, detecting a capacity of remote hardware and software resources, determining future resource requirements, and determining a system capacity for resolving Web traffic demand surges, in accordance with embodiments of the present invention.

FIG. 6 illustrates a computer system 90 (e.g., remote server 139 and/or remote hardware and software resources 122 of FIG. 1) used by or comprised by the system of FIG. 1 for improving software and server technology associated with tracking software application downloads, detecting a capacity of remote hardware and software resources, determining future resource requirements, and determining a system capacity for resolving Web traffic demand surges, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, a network device 72 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving software and server technology associated with tracking software application downloads, detecting a capacity of remote hardware and software resources, determining future resource requirements, and determining a system capacity for resolving Web traffic demand surges. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device). The networking device 72 is a device designed to communicate with other computer systems over networks commonly known as local area networks, wide area networks, campus area networks, and metropolitan area networks, using physical links such as, inter alia, wired, optical, or wireless, using data link protocols such as TCP/IP, UDP, ATM, Frame Relay, etc.

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software and server technology associated with tracking software application downloads, detecting a capacity of remote hardware and software resources, determining future resource requirements, and determining a system capacity for resolving Web traffic demand surges. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software and server technology associated with tracking software application downloads, detecting a capacity of remote hardware and software resources, determining future resource requirements, and determining a system capacity for resolving Web traffic demand surges. In another embodiment, the invention provides a business method that performs the process steps of the invention on a subscription, advertising, and/or fee basis. That is, a service supplier, such as a Solution Integrator, could offer to enable a process for improving software and server technology associated with tracking software application downloads, detecting a capacity of remote hardware and software resources, determining future resource requirements, and determining a system capacity for resolving Web traffic demand surges. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
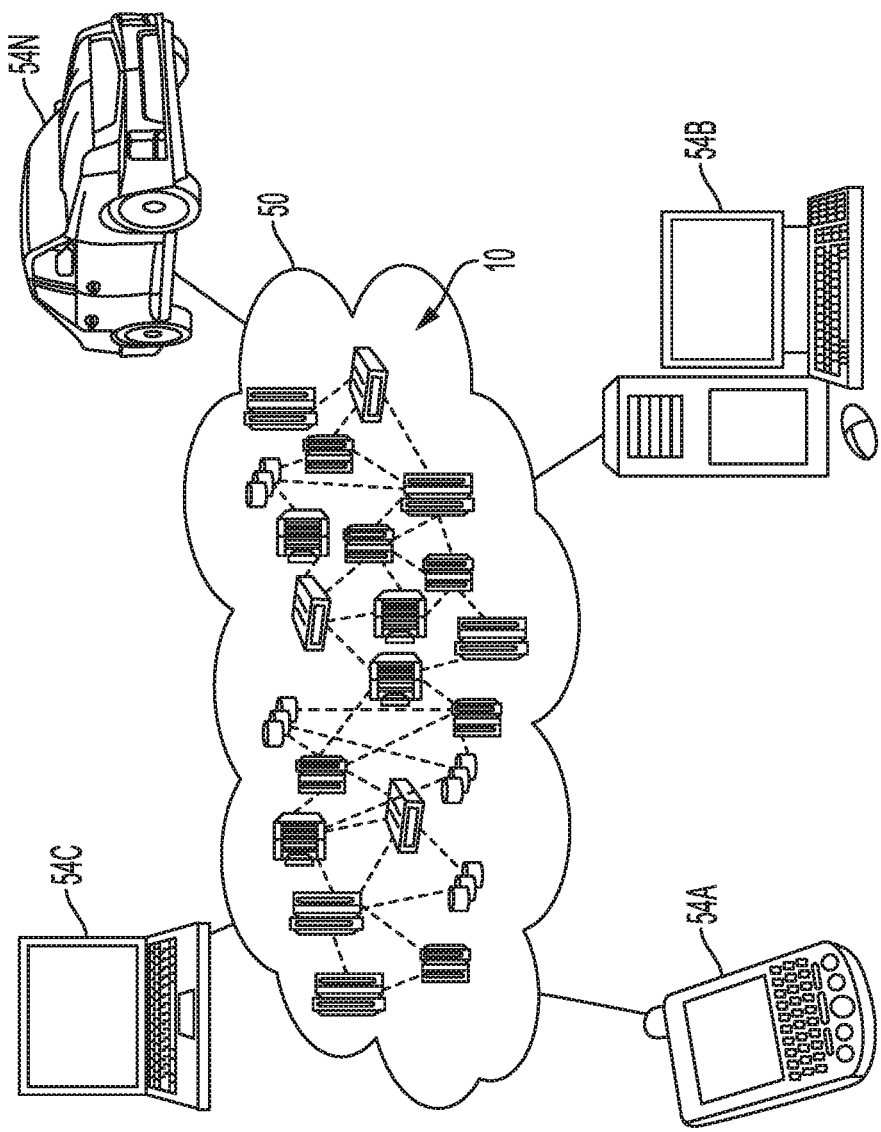
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
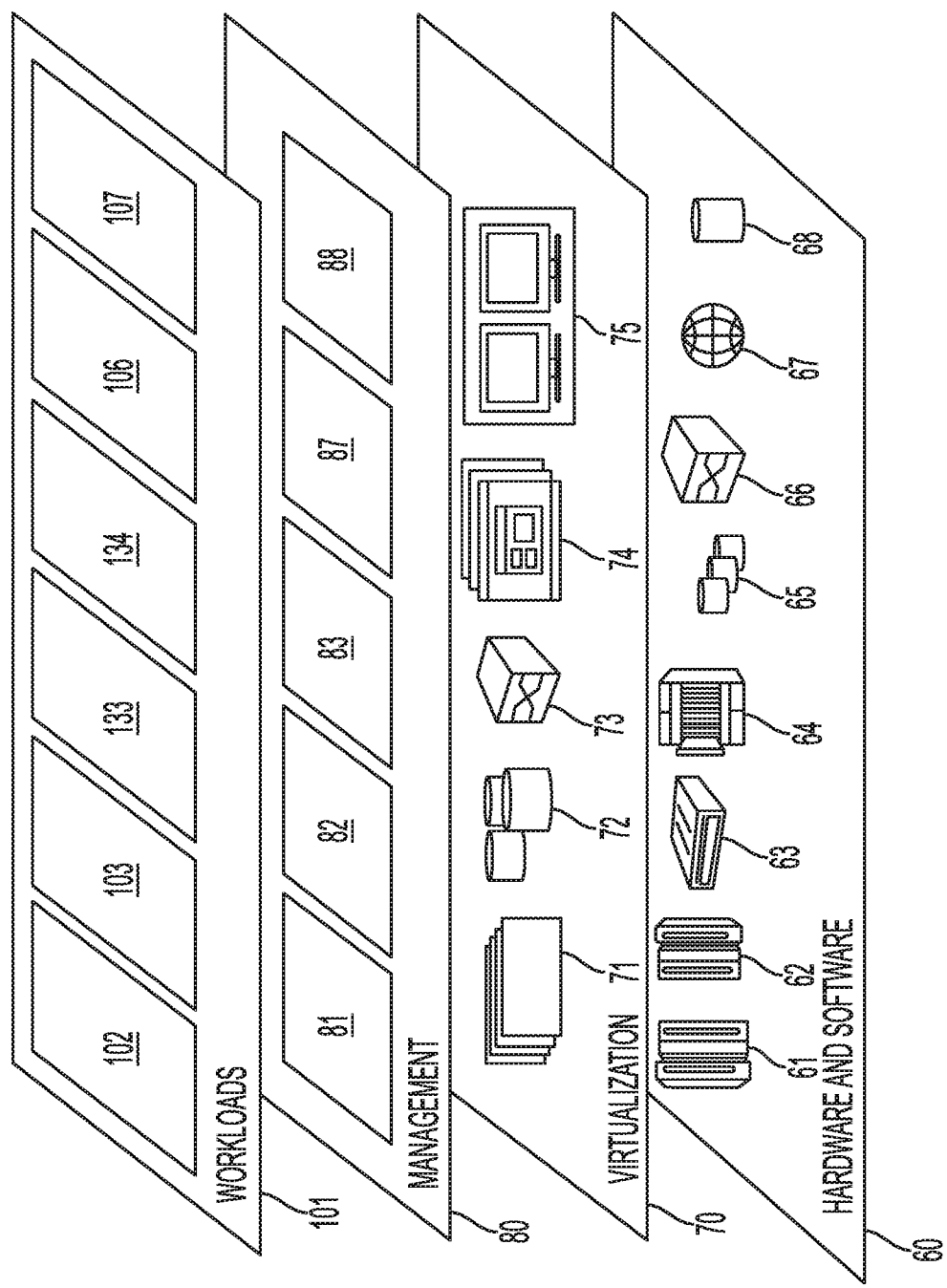
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; improving software and server technology associated with tracking software application downloads, detecting a capacity of remote hardware and software resources, determining future resource requirements, and determining a system capacity for resolving a workload (of system 400 of FIG. 4) 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A remote resource capacity and utilization optimization method comprising:
   determining, by a processor of a remote server executing remote media discovery code, associations with a specified geographical region and an associated topic of interest with respect to social media Website traffic and trends associated with utilization of remote hardware and software resources;
   tracking, by said processor via a download sensor, current and historical software application downloads with respect to said social media Website traffic and trends by;
      detecting, a total number of downloads of said current and historical software application downloads;
      determining based on analysis of said total number of downloads, active user trends with respect to users associated with said current and historical software application downloads;
      determining based on analysis of said active user trends, an additional trend associated with a number of users across said specified geographical region detected as being associated with a previous download event executed via said remote hardware and software resources; and
      generating, an application download tracker (ADT) score associated with a previously determined ADT score with respect to currently active users, said total number of downloads, and a total number of new downloads of said current and historical software application downloads;
   detecting, by said processor via a plurality of sensors, a currently consumed capacity of said remote hardware and software resources with respect to said specified geographical region;
   determining, by said processor, future resource requirements associated with said currently consumed capacity of said remote hardware and software resources;
      storing, by said processor within a database, data representing said current and historical software application downloads and said future resource requirements;
      determining, by said processor based on analysis of said data, an overall system capacity for enabling regionally specific demand surges associated with regional Web traffic; and
      enabling, by said processor, a specified group of hardware and software resources for increasing said overall system capacity.

2. The method of claim 1, wherein said determining said associations comprises:
   retrieving, Website data from a plurality of social media Websites associated with said social media Website traffic and trends;
   aggregating said Website data; and
   generating, based on aggregated data generated in response to said aggregating, a regional score for said utilization of said remote hardware and software resources with respect to said specified geographical region.

3. The method of claim 1, wherein said storing said data comprises:
   storing, said data with respect to all download events executed via said remote hardware and software resources;
   storing, consumption data associated with said currently consumed capacity of said remote hardware and software resources with respect to said specified geographical region; and
   storing, a historical interest score associated with predictions for future resource requirements.

4. The method of claim 3, further comprising:
   determining, a correction factor associated with capacity requirements for overall system capacity with respect to said specified geographical region.

5. The method of claim 4, wherein said determining said overall system capacity comprises:
   determining, a capacity factor as a function of said regional score with respect to said ADT score and said correction factor.

6. The method of claim 1, wherein said overall system capacity comprises cloud storage capacity.

7. The method of claim 1, further comprising:
   providing at least one support service for at least one of creating, integrating, hosting, maintaining, and deploying computer-readable code in the remote server, said code being executed by the computer processor to implement: said determining said associations, said tracking, said detecting, said determining said future resource requirements, said storing, said determining said overall system capacity, and said enabling.

8. A computer program product, comprising a computer readable hardware storage device storing a computer readable program code, said computer readable program code comprising an algorithm that when executed by a processor of a remote server device implements a remote resource capacity and utilization optimization method, said method comprising:
   determining, by said processor executing remote media discovery code, associations with a specified geographical region and an associated topic of interest with respect to social media Website traffic and trends associated with utilization of remote hardware and software resources;
   tracking, by said processor via a download sensor, current and historical software application downloads with respect to said social media Website traffic and trends by;
      detecting, a total number of downloads of said current and historical software application downloads;
      determining based on analysis of said total number of downloads, active user trends with respect to users associated with said current and historical software application downloads;
      determining based on analysis of said active user trends, an additional trend associated with a number of users across said specified geographical region detected as being associated with a previous download event executed via said remote hardware and software resources; and
      generating, an application download tracker (ADT) score associated with a previously determined ADT score with respect to currently active users, said total number of downloads, and a total number of new downloads of said current and historical software application downloads;
   detecting, by said processor via a plurality of sensors, a currently consumed capacity of said remote hardware and software resources with respect to said specified geographical region;

determining, by said processor, future resource requirements associated with said currently consumed capacity of said remote hardware and software resources;

storing, by said processor within a database, data representing said current and historical software application downloads and said future resource requirements;

determining, by said processor based on analysis of said data, an overall system capacity for enabling regionally specific demand surges associated with regional Web traffic; and enabling, by said processor, a specified group of hardware and software resources for increasing said overall system capacity.

9. The computer program product of claim 8, wherein said determining said associations comprises:

retrieving, Website data from a plurality of social media Websites associated with said social media Website traffic and trends;

aggregating said Website data; and generating, based on aggregated data generated in response to said aggregating, a regional score for said utilization of said remote hardware and software resources with respect to said specified geographical region.

10. The computer program product of claim 9, wherein said storing said data comprises:

storing, said data with respect to all download events executed via said remote hardware and software resources;

storing, consumption data associated with said currently consumed capacity of said remote hardware and software resources with respect to said specified geographical region; and storing, aa historical interest score associated with predictions for future resource requirements.

11. The computer program product of claim 10, wherein said method further comprises:

determining, a correction factor associated with capacity requirements for overall system capacity with respect to said specified geographical region.

12. The computer program product of claim 11, wherein said determining said overall system capacity comprises:

determining, a capacity factor as a function of said regional score with respect to said ADT score and said correction factor.

13. The computer program product of claim 8, wherein said overall system capacity comprises cloud storage capacity.

14. A remote server comprising a processor coupled to a computer-readable memory unit, said memory unit comprising instructions that when executed by the processor implements a remote resource capacity and utilization optimization method comprising:

determining, by said processor executing remote media discovery code, associations with a specified geographical region and an associated topic of interest with respect to social media Website traffic and trends associated with utilization of remote hardware and software resources;

tracking, by said processor via a download sensor, current and historical software application downloads with respect to said social media Website traffic and trends by;

detecting, a total number of downloads of said current and historical software application downloads;

determining based on analysis of said total number of downloads, active user trends with respect to users associated with said current and historical software application downloads;

determining based on analysis of said active user trends, an additional trend associated with a number of users across said specified geographical region detected as being associated with a previous download event executed via said remote hardware and software resources; and generating, an application download tracker (ADT) score associated with a previously determined ADT score with respect to currently active users, said total number of downloads, and a total number of new downloads of said current and historical software application downloads;

detecting, by said processor via a plurality of sensors, a currently consumed capacity of said remote hardware and software resources with respect to said specified geographical region;

determining, by said processor, future resource requirements associated with said currently consumed capacity of said remote hardware and software resources;

storing, by said processor within a database, data representing said current and historical software application downloads and said future resource requirements;

determining, by said processor based on analysis of said data, an overall system capacity for enabling regionally specific demand surges associated with regional Web traffic; and enabling, by said processor, a specified group of hardware and software resources for increasing said overall system capacity.

15. The remote server of claim 14, wherein said determining said associations comprises:

retrieving, Website data from a plurality of social media Websites associated with said social media Website traffic and trends;

aggregating said Website data; and generating, based on aggregated data generated in response to said aggregating, a regional score for said utilization of said remote hardware and software resources with respect to said specified geographical region.

16. The remote server of claim 15, wherein said storing said data comprises:

storing, said data with respect to all download events executed via said remote hardware and software resources;

storing, consumption data associated with said currently consumed capacity of said remote hardware and software resources with respect to said specified geographical region; and storing, a historical interest score associated with predictions for future resource requirements.

17. The remote server of claim 16, wherein said method further comprises:

determining, a correction factor associated with capacity requirements for overall system capacity with respect to said specified geographical region.

* * * * *